US010324745B2

United States Patent
Tse et al.

(10) Patent No.: US 10,324,745 B2
(45) Date of Patent: Jun. 18, 2019

(54) THIN CLIENT WITH MANAGED PROFILE-SPECIFIC REMOTE VIRTUAL MACHINES

(71) Applicant: AirWatch, LLC, Atlanta, GA (US)

(72) Inventors: Kar Fai Tse, Peachtree Corners, GA (US); Ketan Bhardwaj, Atlanta, GA (US); Erich Stuntebeck, Johns Creek, GA (US)

(73) Assignee: AirWatch, LLC, Atlanta, GA (US)

( * ) Notice: Subject to any disclaimer, the term of this patent is extended or adjusted under 35 U.S.C. 154(b) by 124 days.

(21) Appl. No.: 15/012,820

(22) Filed: Feb. 1, 2016

(65) Prior Publication Data

US 2017/0220368 A1 Aug. 3, 2017

(51) Int. Cl.
| | |
|---|---|
| *G06F 9/455* | (2018.01) |
| *G06F 8/61* | (2018.01) |
| *G06F 21/30* | (2013.01) |
| *H04L 29/06* | (2006.01) |

(52) U.S. Cl.
CPC ............ *G06F 9/45558* (2013.01); *G06F 8/61* (2013.01); *G06F 21/30* (2013.01); *G06F 2009/45562* (2013.01); *G06F 2009/45575* (2013.01); *H04L 63/10* (2013.01)

(58) Field of Classification Search
CPC .......................................... G06F 9/45533–9/46
See application file for complete search history.

(56) References Cited

U.S. PATENT DOCUMENTS

| | | | | |
|---|---|---|---|---|
| 2004/0250130 A1* | 12/2004 | Billharz | ............... | H04L 63/0272 726/15 |
| 2007/0180493 A1* | 8/2007 | Croft | ...................... | G06F 3/1415 726/2 |
| 2009/0222880 A1* | 9/2009 | Mayer | ................... | G06F 21/604 726/1 |
| 2010/0162235 A1* | 6/2010 | Ginzton | .................. | G06F 9/455 718/1 |
| 2012/0089666 A1* | 4/2012 | Goswami | ............. | G06Q 10/103 709/203 |

(Continued)

OTHER PUBLICATIONS

Toward a flexible and fine-grained access control framework for infrastructure as a service clouds Bo Li, Jianxin Li, Lu Liu and Chao Zhou Published: Feb. 17, 2015.*

*Primary Examiner* — Emerson C Puente
*Assistant Examiner* — Paul V Mills
(74) *Attorney, Agent, or Firm* — Clayton, McKay & Bailey, PC

(57) ABSTRACT

Systems herein include thin clients that operate with managed profile-based virtual machines. This can allow users to utilize personal user devices in an enterprise environment without subjecting sensitive enterprise credentials to the user device. A management server can determine a profile associated with the user device. Based on the profile, a virtual machine can be instantiated at a thin server, remotely from the thin client. The profile-specific virtual machine can include a particular guest operating system, guest applications, security features, or functionality. The instance of the virtual machine can communicate graphics information from a guest application to the thin client, and the thin client can communicate user interface events to the instance for controlling the guest application.

17 Claims, 5 Drawing Sheets

(56) References Cited

U.S. PATENT DOCUMENTS

| | | | |
|---|---|---|---|
| 2012/0124092 A1* | 5/2012 | Teranishi | G06F 21/604 707/783 |
| 2012/0233668 A1* | 9/2012 | Leafe | G06F 9/44526 726/4 |
| 2012/0297311 A1* | 11/2012 | Duggal | G06F 9/468 715/740 |
| 2013/0007737 A1* | 1/2013 | Oh | G06F 9/4445 718/1 |
| 2013/0268580 A1* | 10/2013 | Vilke | G06F 9/54 709/203 |
| 2014/0068718 A1* | 3/2014 | Mureinik | G06F 21/604 726/4 |
| 2015/0268982 A1* | 9/2015 | Eisenmann | G06F 9/45558 718/1 |
| 2017/0046013 A1* | 2/2017 | Reskusich | G06F 3/0481 |

\* cited by examiner

THIN CLIENT WITH MANAGED PROFILE-SPECIFIC REMOTE VIRTUAL MACHINES

BACKGROUND

Enterprises have experienced a substantial increase in the productivity of its workforce when using mobile devices. As mobile device technology has increased, enterprises have seen an influx of personal devices in the workplace. Because users often prefer to carry fewer mobile devices, they would rather use personal devices for work functions. The use of personal devices in an enterprise environment can lead to increased productivity and potentially lower technology costs.

However, the use of personal devices in an enterprise environment presents security concerns. Enterprise mobility management solutions attempt to solve security problems by providing managed applications that can access company documents while imposing appropriate restrictions. These solutions often attempt to keep enterprise data separate from personal data, allow enterprise data to be remotely deleted from the device, and enforce encryption policies for locally stored enterprise data. However, because the enterprise files are accessed on the personal user device, sensitive enterprise data and credentials are still stored on the user device, exposing the data to security flaws.

The wide range of operating systems and characteristics of personal user devices also can make it difficult to ensure compatibility of managed applications. Managed solutions and security features often must be separately developed for each major operating system. In addition, some applications are simply unavailable for certain operating systems.

For at least these reasons, a need exists for thin clients with managed profile-specific remote virtual machines.

SUMMARY

It is to be understood that both the foregoing general description and the following detailed description are exemplary and explanatory only and are not restrictive of the examples, as claimed.

An example system for profile-specific virtual machines can include a non-transitory, computer-readable medium that contains instructions, and a processor that executes the instructions to perform stages. The stages can include sending a thin client to a user device for installation. The thin client can be an application that serves as a graphical user interface for one or more guest applications on a virtual machine. The guest applications can execute on a remote thin server, keeping sensitive credentials and other non-graphics information from ever reaching the user device.

In one example, a profile is assigned to the user device. The profile can specify which enterprise applications, files, and other data the user device can utilize. The guest applications can be any applications, such as WORD, EXCEL, a work email application, or other applications used within the enterprise. Instead of storing these applications, files, and associated credentials locally on the user device, the user device can access them in a remote virtual machine environment.

In one example, the profile can specify a virtual machine configuration, indicating a set of rules and software configurations that apply in the virtual environment for the user device. The profile can be based on user characteristics, geographical characteristics, or user device characteristics. The profile can specify a user group to which the user device belongs. For example, software developers and executives can belong to different user groups. Profiles can also be geographically based to apply, for example, different rules to employees that work at different office locations. A first profile can apply when the user device is within a geofence and a second profile can apply outside the geofence. Different profiles can also be associated with different device hardware or software configurations. The different configurations can control which applications, files, or functions within the applications are available to the user device.

The system can receive a frame buffer request from the thin client. A frame buffer request can include a request to receive graphics information from a guest application. The frame buffer request can also request a connection with an instance of a virtual machine that will execute the guest application.

Based on the profile assigned to the user device, the system can select the virtual machine from multiple virtual machines. An instance of the selected virtual machine can be instantiated on a thin server that is remote from the thin client. The instance can incorporate the virtual machine configuration associated with the profile. For example, the virtual machine configuration can determine the availability of particular applications, files, or functionality within the instance.

In one example, the profile-specific instance can execute a modified guest operating system that includes a guest management component for customizing functionality. Possible functionality customization can include eliminating camera or microphone functionality on the mobile device to prevent data leakage. The thin server or guest operating system can also include passwords, certifications, and other sensitive information, eliminating the need to physically store these on the user device.

The instance can also execute a guest application based on the virtual machine configuration. The guest application can be used for performing a workforce task, such as email, word processing, or any other task. The guest application can generate graphics information that is sent to a virtual frame buffer rather than a hardware frame buffer. The thin server can then send the graphics information from the frame buffer to the first user device. In one example, the instance can connect to the thin client using a socket, and send the graphics information to the thin client for display.

While displaying the graphics, the thin client can listen for user interface events. User interface events can include clicks, mouse movements, key presses, touchscreen events, scroll wheel events, or any other user input. The thin client can report detected user interface events to the instance. In turn, the instance can execute those user interface events within the guest application.

Such a system can provide enhanced security by eliminating storage of enterprise credentials and data on a user device. In addition, the virtual machine can execute a different operating system than the operating system executing the thin client. As a result, even applications that are unavailable for the operating system of the thin client can be made available through the thin client by hosting the virtual machine in a different operating system that can execute the desired application.

DESCRIPTION OF THE EXAMPLES

Figure 1:
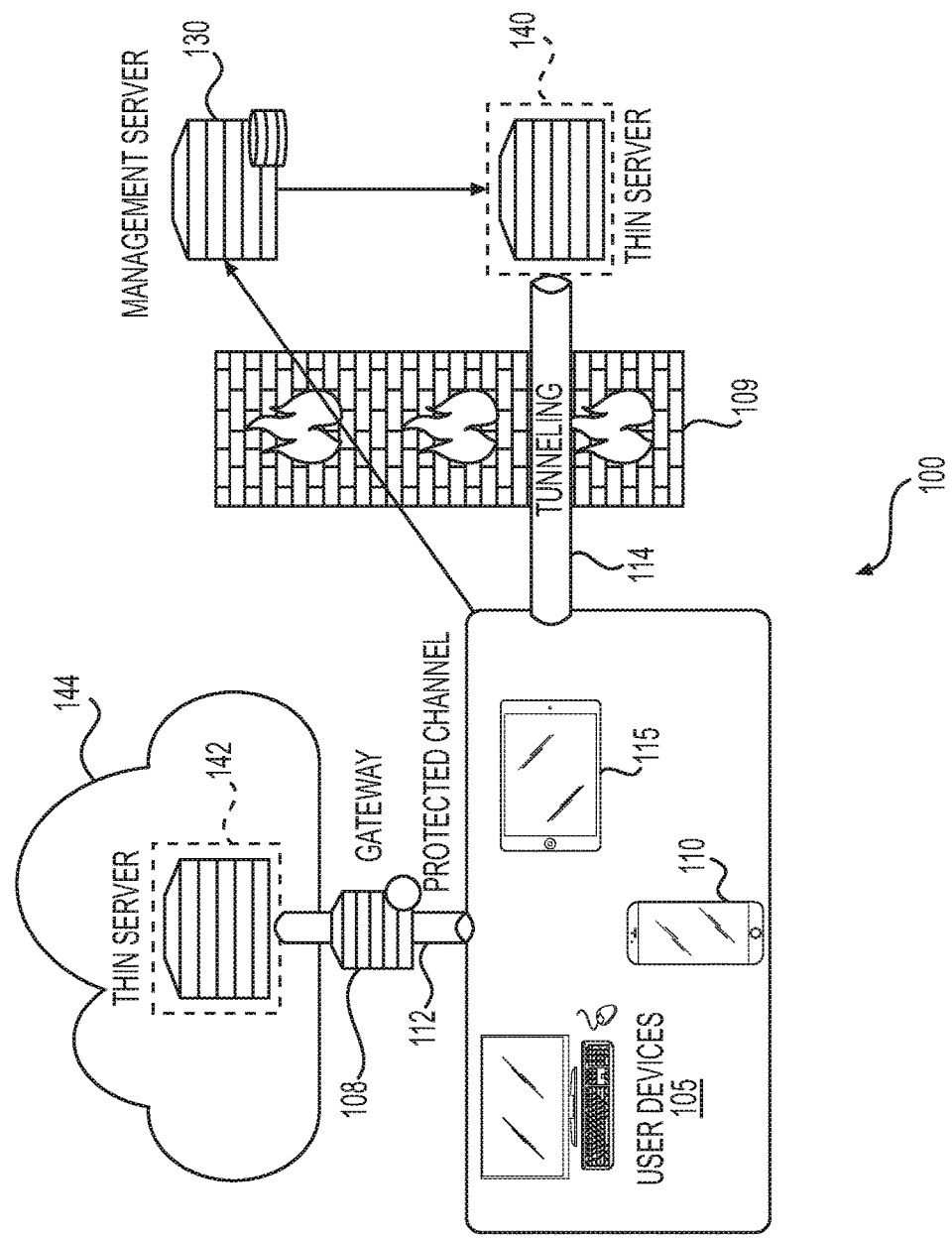
FIG. 1 is an exemplary illustration of system components.

Reference will now be made in detail to the present examples, including examples illustrated in the accompanying drawings. Wherever possible, the same reference numbers will be used throughout the drawings to refer to the same or like parts.

Examples described herein include systems for using a thin client in an enterprise mobility management environment to run managed applications on a remote thin server. The thin client can be a managed application that executes on a user device. Upon execution, the thin client can contact the management server. The management server can determine a profile that corresponds to the user device. The profile can include a set of permissions that can determine which applications the user can access, the functionality available within the applications, and the documents and file locations that are accessible. In one example, these applications and files can be accessed in a remote virtual machine environment rather than installed or stored directly on the user device.

Based on the profile, the management server can cause a thin server to instantiate an instance of one of a plurality of virtual machines. The instance can be chosen to run a virtual machine configuration that includes a specific guest operation system, specific guest applications, and specific permitted or disallowed functionalities. The profile-specific instance can include only a subset of possible guest applications, and can include custom configurations of those guest applications to limit functionality. In one example, the guest operating system in the instance can be preset to omit or include certain guest processes, security features, and management features for a profile-specific experience. This can allow an enterprise to enforce or modify enterprise security, functionality, and access with respect to personal user devices while keeping applicable credentials and other sensitive information away from the user devices.

In one example, the profile-specific instance can send graphics information to the thin client at the user device for display. A frame buffer process running in the instance can buffer graphics data generated by the guest application(s). From the frame buffer, the instance can send the graphics data as pixels to the thin client, where the graphics are displayed to the user. While the thin client displays the graphics, it can also listen for user interface ("UI") events, such as clicks, mouse movements, selections, typing, and other user inputs. The thin client can send these UI events back to the instance of the virtual machine for performance within the guest application on the virtual machine.

Sharing graphics information and UI events in this manner can allow a user to execute enterprise applications agnostically with regard to the operating system required for the enterprise applications. In addition, security can be increased since critical credentials can be kept at the thin server rather than the user device. The user device instead can receive graphics information such as pixel data. In this way, the vast majority of security features can be enforced outside of the user device, reducing the chances of a security breach at the user device and further securing the enterprise environment.

FIG. 1 illustrates an exemplary system 100 for thin clients that operate with profile-specific instances of virtual machines. User devices 105 can execute a thin client that connects to a management server 130. User devices 105 can be any computing device, such as a cell phone, laptop, tablet, personal computer, or workstation. Each user device 105 can include a non-transitory computer-readable medium containing instructions that are executed by a processor. Exemplary non-transitory, computer-readable mediums include RAM and ROM, disks, and other memory and storage that is accessible by a USB port, a floppy drive, CD-ROM, or DVD-ROM drive, and a flash drive, among others.

The user devices 105 can enroll with the management server 130 in order to receive a thin client for execution on the respective user device 105. During enrollment or afterward, the management server 130 can assign one or more profiles to a first user device 110 that can be different than one or more profiles assigned to a second user device 115.

The different profiles can be assigned based on different security or access needs for the different user devices 105. User devices 105 can be assigned to one or more groups, with each group describing different security or access levels. For example, an executive group can have different security access than a standard employee group. The executives therefore may be able to access applications that analyze corporate financial information, while other employees cannot. Different groups can also be assigned for different divisions of an enterprise. The profiles can identify technical differences between user devices 105, including the operating system, hardware characteristics, wireless provider subscriptions, and device builds of each user device 105. Operating systems can be tracked by version and type.

The management server 130 can store the profiles in a database. For example, a profile table can contain profile identifiers and user device identifiers, linking specific user devices 105 to specific profiles. Technical features of a user device 105 can be stored in or linked to the profile table. Another table can link profile identifiers to virtual machine configurations. The table or other link between profiles and configurations can be stored at the management server 130 in one example. In another example, the thin server 140 stores configuration information and the management server 130 specifies which virtual machine configuration to use based on a profile identifier or configuration identifier.

The virtual machine configuration can specify which virtual machine to instantiate from a plurality of virtual machines. The different virtual machines can include different guest operating systems, different access restrictions for files, different guest applications, and different permitted functionality. Therefore, the profile can determine which files, applications, and functions are permitted for the user devices 105.

Upon enrollment, the thin client can be downloaded by the first user device 110 and locally installed. The thin client can be displayed to a user as one or more icons on the user device 110. For example, the thin client can display an icon for each particular application that the user can execute based on the profile settings and permissions for that user. When the user selects the icon, the thin client can initiate the process of contacting a thin server 140, 144, which will create a virtual machine that can execute the corresponding application based on a user's profile, as described in more detail below. In another example, the thin client can display a single icon to a user, such as an icon labeled enterprise apps. When the user selects the enterprise apps icon, the thin client can display additional icons that the user can select based on their profile. In this manner, the user can view the thin client, or thin clients when one thin client corresponds to each application, as if it is the application itself. Accordingly, icons can be provided to the user device to launch even applications that cannot execute on the user device 110 in situations where an application is not available for the operating system of the user device 110. The user need not install copies of the applications on their own user device 110 from an application store because the applications can be remotely installed and executed in a seamless manner to the user using the thin client.

When executed, the thin client can access one or more managed applications by requesting a frame buffer. The request can initially go to the management server 130, which stores at least one profile for the first user device 110. In one example, the management server 130 can identify a corresponding profile based on a device identifier in the frame buffer request. The profile can also store a key, certificate, or other form of authentication credential to ensure an authorized user has accessed the application. In other examples, the thin client can request credentials from a user upon launch of the thin client. The credentials can be a username and password, a biometric identifier such as a fingerprint, a particular gesture, or other type of credential. The credentials can be provided to the management server 130 or thin server 140 without being maintained in long-term storage or caching on the user device 110. The credentials can vary based on the particular application that a user wants to execute from the thin client. For example, a user can access a corporate calendar without providing additional credentials, but using an application to access a corporate file repository may require authentication. The credentials can also identify a particular user when multiple users share a single device, allowing the thin client to display the appropriate profile-specific applications and features for a particular user. In other examples, receiving credentials may not be necessary where the management component 211 enforces security restrictions on the user device. For example, the management component 211 can require that a user have a PIN or password of a defined length to unlock their device. Once the user has unlocked their device, additional authentication when launching the thin client can be avoided, depending on the desired level of security for an enterprise's applications. The management component 211 can also store a certificate and use other forms of single-sign on to identify and authenticate a user without requiring additional user input upon selecting the thin client.

Based on the identified profile, the management server 130 can send a profile-specific frame buffer request to a thin server 140. This request can identify a virtual machine configuration that can specify one or more guest application(s) to execute at the thin server 140. Alternatively, the thin server 140 can determine the appropriate virtual machine and configuration based the profile-specific frame buffer request.

In one example, the virtual machine configuration can specify which virtual machine to instantiate from among multiple possible virtual machines. The different virtual machines can be preset to use different operating systems in one example. The different operating systems can be either different types of operating systems or the same operating system with different preset functionality. Different virtual machines can also be set up to execute different guest applications. The profile-based virtual machine configuration can also specify which features will be available within the guest application(s) that execute within the respective virtual machine. For example, email or web access can be turned on or off within a guest application based on the virtual machine configuration.

In one example, the thin server 140 can instantiate a new instance of a virtual machine for each user device 105 that connects using the thin client, based on the respective profile of each user device 105. In another example, multiple thin clients can connect to a single instance of a virtual machine. For example, if an instance is already executing that corresponds to a common profile of multiple user devices 105, multiple user devices 105 can execute guest applications within that same instance. In addition, multiple virtual machines can be created for a user device to allow the user device to effectively execute applications from different operating systems. For example, if a first application is only available on a first operating system, and a second application is available on a second operating system, two virtual machines can be created. When a user selects the icon for a particular application using the thin client, communications can be routed through a socket to the corresponding virtual machine, allowing any application to execute on any user mobile device regardless of its operating system.

The thin client and thin server 140 can communicate over a network through a secure tunnel 114 through the firewall 109. The connection can be based on a socket at an instance of a virtual machine. The network can be an enterprise network in one example. The network can include the Internet, a local area network, or any other suitable communication platform. The first user device 110 can communicate with the thin server 140 and management server 130 over the network using one or more modulators, demodulators, multiplexers, demultiplexers, network communication devices, wireless devices, antennas, modems, and any other type of device configured to enable data communication through a communication network. For example, the user devices 105 can be mobile devices, such as smart phones and tablets, communicating over Wi-Fi, 4G, and 5G networks.

An instance communicating with the thin client can send graphics information from the thin server 140 to the first user device 110. The graphics information can be pixel data for the guest application in the instance of the virtual machine in one example. The pixel data can be sent in frames, with each frame representing a snapshot of screen graphics. In another example, the graphics information can be vector data for recreating the image at the thin client.

The thin client can display the graphics information in a graphical UI on the first user device 110. This can allow the user to see what is happening on the guest application within the instance even though the first user device 110 is remote from the instance.

While the graphics information is being displayed, the thin client can also listen for UI events, which can be any user input on the first user device 110. The thin client can send the UI events through the tunnel 114, such as a socket, to the instance at the thin server 140. The thin server 140 can then cause these UI events to be recreated within the guest application. This can allow, for example, a user to click on a graphical representation of a button within the thin client and cause the actual button at the thin server 140 to be activated. In this manner, a user may be unaware that the application is being remotely executed by a virtual machine on the thin server 140.

Another thin server 142 can be based in the cloud 144 in an example. The management server 130 can similarly communicate a profile-specific frame buffer request to the cloud-based thin server 142. This can cause the cloud-based thin server 142 to instantiate and configure an instance of a virtual machine based on a configuration for the profile-specific frame buffer request. In another example, the cloud-based thin server 142 performs the functions of the management server 130 without a separate management server 130. The cloud-based thin server 142 can communicate with the thin client through a protected channel 112 that includes a gateway 108.

Figure 2:
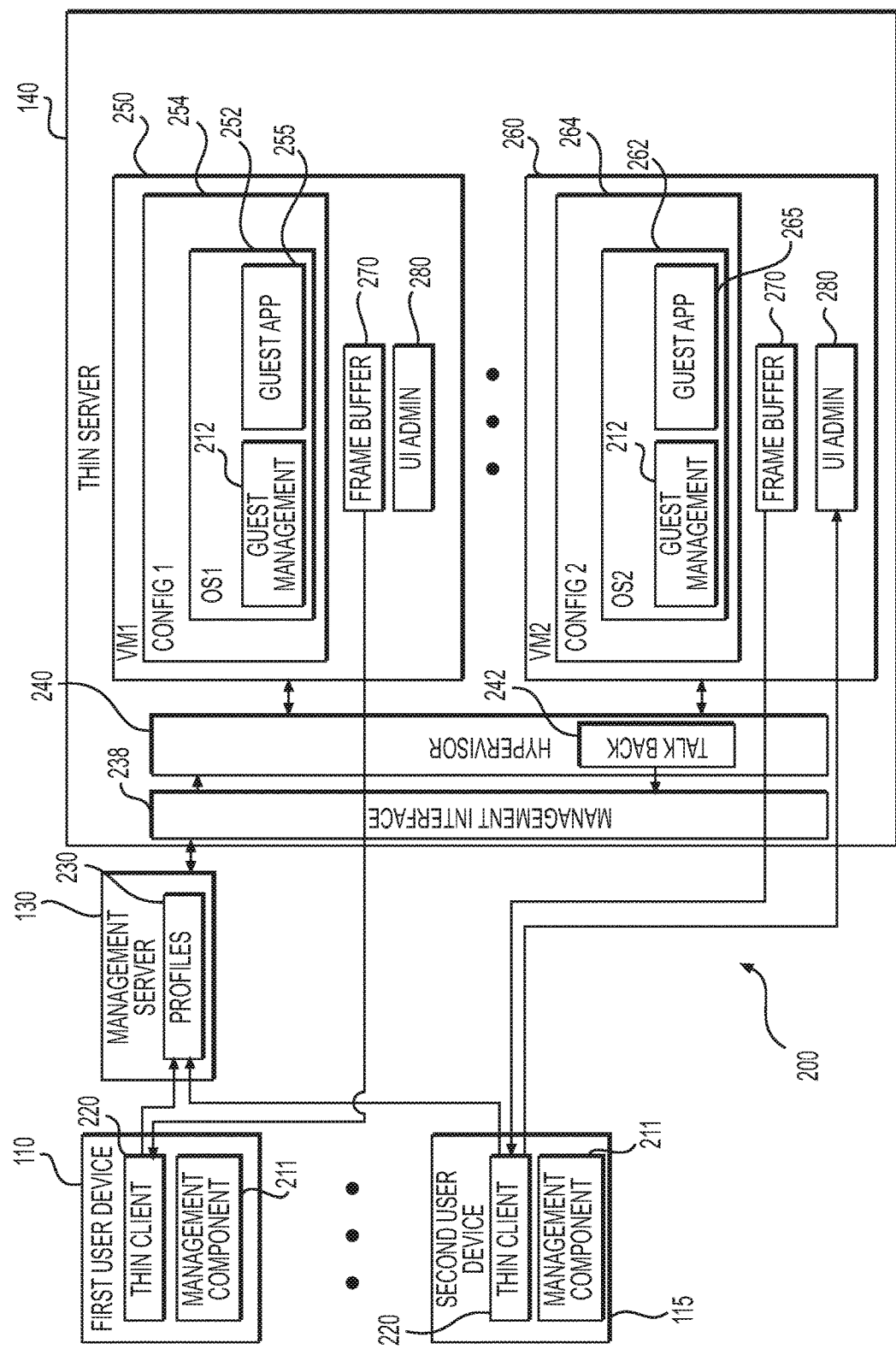
FIG. 2 is an additional exemplary illustration of system components.

FIG. 2 illustrates example system 200 with thin clients 220 that operate with remote profile-specific instances 250 and 260 of virtual machines. In this example the first user device 110 and second user device 115 each execute a thin client 220 and a management component 211. In one example, the management server 130 can update or uninstall the thin client 220 through interaction with the management component 221 of the respective devices 110 or 115. For example, the management server 130 can send a message to the user device 110 or 115 to request that the device install the thin client 220. In another example, installation of the thin client 220 does not require or utilize a management component 211.

The thin client 220 can allow a user to communicate on the enterprise network with the management server 130 to securely access enterprise files and managed guest applications. This can allow a user to use their own user device 110, such as a cell phone, in a work environment while limiting access to work files (e.g., by providing file access only to the managed applications).

The management component 211 can include a device-level component, such as an application programming interface (an "API"), agent application, hypervisor, or virtualized device, and an application-level component, such as an API, SDK, application wrapper, or workspace agent application. The device-level management component can include system level privileges. The application-level management component can include privileges in the thin client 220 or other managed applications. Reference to the management component 211 is understood to include either or both of the device-level and application-level components unless otherwise specified.

A similar guest management component 212 can execute within the instances 250 and 260 of the virtual machines, as will be described below.

In one example, the management server 130 can interact with the management component 211 of the user device 110 for additional security. If a permission control specifies it, the management server 130 can turn off functionality at the user device 110, such as printing, emailing, or Internet access. This can allow for added security when viewing or editing particularly sensitive document portions.

The thin client 220 can be a managed application that is installed on the first user device 110 from the management server 130. In one example, during enrollment, the management server 130 can exchange communications with the management component 211 to cause the thin client to install. The management server 130 can also send a message to the operating system on the first user device 110, causing the operating system to lock the first user device 110 into the thin client 220. While the lock is in place, the user can be restricted to using the thin client 220 and not switching to other applications. This can reduce chances of another application being used to control or copy graphical information from the thin client 220. In addition, the management server 130 can utilize the management component 211 to uninstall the thin client 220. This can be done, for example, if the user device 110 is lost or if an employee leaves the job.

As previously discussed, the management server 130 can store profiles 230 for user devices 110 and 115. When the management server 130 receives a frame buffer request from the thin client 220 of the first user device 110, the management server 130 can identify a profile 230 associated with the first user device 110. In one example, multiple profiles 230 can be identified as corresponding to the first user device 110.

Based on the identified profile(s) 230, the management server 130 can send a profile-specific frame buffer request to the thin server 140. When multiple profiles apply, a virtual machine configuration that encompasses all of the permitted features of the multiple profiles 230 can be selected for use at the thin server 140. Otherwise, the virtual machine configuration associated with a single profile 230 can be utilized.

The thin server 140 can communicate with the management server 130 through a host management interface 238 executing on the thin server 140. The host management interface 238 can, in one example, provide a two-way communication channel with the management server 130.

Additionally, one or more guest applications 255 and 265 can execute within the virtual machine instances 250 and 260 based on profile-specific virtual machine configurations 254 and 264. For example, a first profile 230 associated with the first user device 110 can be linked to a first configuration 254 that allows access to a first guest application 255 but not a second guest application 265. Further, the first guest application 255 can be configured to limit some functionality, such as emailing or printing, based on the first configuration 254.

Likewise, a second guest application 265 can execute in a second instance 260 of a virtual machine, based on a second configuration 264. The second guest application 265 can be accessible to users associated with a second profile 230. For example, when the thin client 220 of the second user device 115 generates a frame buffer request, the management server 130 can determine that the second profile 230 is associated with the second user device 115. The second profile 230 can also be associated with the second configuration 264. The management server 130 can send a profile-specific frame buffer request to a thin server 140, indicating that the second virtual machine instance 260 should execute the second guest application 265 for the second user device 115.

In another example, the first and second guest applications 255 and 265 can be the same guest application. However, the different configurations 254 and 264 can cause that same guest application to operate differently for different profiles 230. The same application can grant first user device 110 a different level of functionality or access than the second user device 115.

Different virtual machine instances 250 and 260 can also utilize different guest operating systems 252 and 262 in one example. This can allow a user device 110 to execute a guest application 255 that is not otherwise compatible with the local operating system on the user device 110. An enterprise can avoid compatibility problems related to the many different operating systems and versions that can exist on personal user devices 110 and 115. Instead, the system 200 can use the thin server 140 to instantiate a virtual machine with whichever operating system 252 or 262 is needed for a particular guest application 255 or 265. The user device 110 can then remotely control the guest application 265 or guest operating system 262 without having to install the operating system 262 locally on the user device 110.

In one example, an enterprise can configure an operating system differently for different profiles 230. For example, a first operating system 252 can include additional guest management 212 features while blocking access to certain file repositories, as compared to a second operating system 262. The operating systems 252 and 262 can, therefore, be considered different even though they both execute a common base operating system (e.g., WINDOWS, iOS, ANDROID, or LINUX). By customizing the guest management component 212 differently, more or less control from the management server 130 can be built into different operating system versions 252 and 262.

A hypervisor 240 can execute on the thin server 140 to manage multiple virtual machine instances 250 and 260 that execute on the thin server 140. Host processes on the thin server 140 can communicate with the instances 250 and 260 through the hypervisor 240. This can allow the thin server 140 to share host system resources with the guest operating systems 252 and 262 and guest applications 255 and 265.

A talkback process 242 running within the hypervisor 240 can also allow the guest applications 255 and 265 and guest operating systems 252 and 262 within the instances 250 and 260 to communicate with the management interface 238 or other host processes of the thin server 140. This can allow a guest application 255 to use the thin server's 140 credentials and management interface 238 to contact the management server 130. This can be done when permission is needed for a guest application 255 to access a managed repository for file retrieval purposes. As an example, the guest application 255 can have a menu that allows the user to open a file stored within the enterprise environment. Upon selection of the menu item, the guest application 255 can use the talkback process 242 in the hypervisor 240 to request a credential from the thin server 140. Then, the talkback process 242 can cause the management interface 238 to supply the credential to the management server 130. Based on the credential and identification of the user device 110 or 115, the management server 130 can provide access to one or more files that are accessible by the user device 110 or 115.

In another example, the guest management component 212 within an instance 250 can allow for interaction between the management server 130 and guest applications 255 or guest operating system 252 of the instance 250. In that case, the management server 130 can interact with the guest management component 212 with calls to a guest application 255 (e.g., application level) or the guest operating system 252 (e.g., device level) of the instance 250. The guest application 255 or guest operating system 252 can register with the management server 130 in one example by sending a registration message through the talkback process 242 to the management interface 238 of the thin server 140. The management interface 238 can forward the registration message to the management server 130 along with host credentials at the thin server 140 used by the management server 130 to trust the registration message.

This can allow an administrative user to manage and make changes to functionality within guest applications 255 and 265 being used by thin client 220 users. For example, the management server 130 can turn functionality on and off within the guest applications 255 and 265 through calling subroutines in the management component 212. This can be useful in an environment where user permissions or file access within a guest application 255 needs to be changed in real time.

As previously discussed, the thin server 140 can instantiate a new instance 250 or 260 of a virtual machine for each user device 110 and 115 that connects using the thin client 220. Alternatively, an instance 250 or 260 of a virtual machine can be shared by multiple user devices 105 that are associated with the same profiles 230 at the management server 130. When the thin server 140 receives a profile-specific frame buffer request associated with a first user device 110, the thin server 140 can determine whether an instance 250 already has been instantiated for the associated configuration 254. If so, the thin server 140 can cause at least one guest application 255 to execute within the instance 250 for the first user device 110. For example, the thin server 140 can send an execution command to the hypervisor 240 for relaying to the first instance 250.

A virtual machine instance 250 can include a virtual frame buffer 270 for receiving graphics information generated by the guest operating system 252 or guest application 255. Rather than sending the graphics information to a hardware frame buffer at the thin server 140, the virtual frame buffer 270 can buffer the graphics information. The frame buffer 270 or another process executing in the instance 250 can communicate the graphics information from the frame buffer 270 to the remotely-connected thin client 220 for display.

The thin client 220 can communicate with the instance 250 through a socket in one example. Upon receiving the graphics information, the thin client 220 can supply the graphics information to the local hardware buffer of the user device 110 where the thin client 220 is executing. In another example, the thin client 220 can combine the graphics information with additional graphics information generated by the thin client 220 before supplying the combined graphics information to the hardware frame buffer for display at the user device 110.

In an example where multiple user devices 105 share a common virtual machine instance 250, the common instance 250 can execute separate frame buffers 270 for each user device 110 and 115 sharing the instance 250. This can ensure that graphics are not intermingled between the different user devices 105 that are connected to the first instance 250. Conversely, in examples where separate instances 250 and 260 are instantiated for different user devices 105, a single frame buffer 270 can execute in each instance 250 and 260.

An instance 250 can also include a UI administration process 280 in one example. The UI administration process 280 can replicate UI events received from the thin client 220. The UI administration process 280 can perform the received UI events within the guest application 255 or guest operating system 252 as if the user were directly performing the UI events within the guest environment. In one example, the UI admin process 280 recognizes a specific set of UI events that can be generated by the thin client 220, and translates those UI events into a format that can be understood by the guest operating system 252 or guest application 255. Alternatively, a host process can execute at the thin server 140 that receives UI events from the user devices 105. The host process can then route the UI events to the appropriate instance 250 or 260 through the hypervisor 240 and to the corresponding UI administration process 280.

Figure 3:
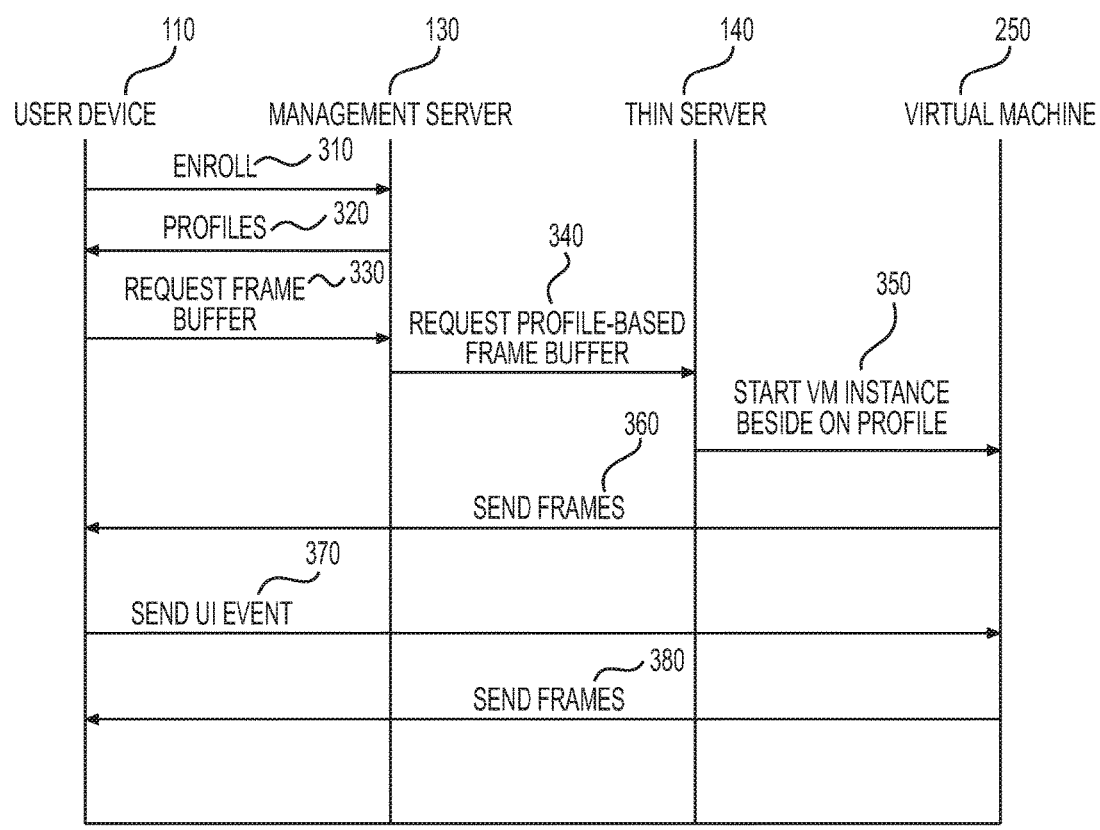
FIG. 3 is an exemplary method executed in a system.

FIG. 3 is an example method including stages that can be executed in a system. At stage 310, a user device 110 can enroll with the management server 130. Enrollment can occur as part of an initiation process required for using the user device 110 in an enterprise environment. The management server 130 can associate the user device 110 with one or more profiles 230 based on geographic location, device characteristics, and user role characteristics. Geographic locations can be determined based on geofencing. For example, in a multi-location enterprise, a different profile 230 can be assigned based on the user device 110 being located at one of those multiple locations. These types of profiles 230 can, for example, prevent the user device 110 from accessing file repositories or application features that are only available at other locations. The management server 130 can consider user device factors, including whether the user device 110 is jail broken, the version and type of operating system on the user device 110, and whether the user device 110 includes certain white-listed applications. User role characteristics can relate to the position the user holds within an enterprise or other organization and can also be considered by the management server 130. For example, an employee in human resources can have a different role than an executive. Based on some or all of these factors, one or more profiles 230 can be assigned.

At stage 320, the management server 130 can send profile-based policies or information to the user device 110. This can include causing the user device 110 to install the thin client 220 or other management applications. In one example, the thin client 220 is installed with a user device identifier that the thin client 220 sends to the management server 130 for use in identifying a profile 230. The profile-based information can also include an address for contacting the management server 130 and a token for use in encrypting communications to the management server 130. To cause the user device 110 to install the thin client 220 or store the token, the management server 130 can send a message to the management component 211 of the user device 110. This can also allow the management server 130 to uninstall the thin client 220, such as when an employee leaves an enterprise or a geofenced area.

When the user device 110 executes the thin client 220, at stage 330 the thin client 220 can request a frame buffer for displaying graphics. The frame buffer request can be sent to the management server 130 and can identify the user device 110 in an example. The management server 130 can then identify one or more profiles 230 associated with the user device 110.

At stage 340, based on the identified profile(s) 230, the management server 130 can send a profile-specific frame buffer request to the thin server 140. This can include retrieving and sending a profile identifier or configuration information associated with the one or more profiles 230.

At stage 350, based on the profile 230 and the associated virtual machine configuration, the thin server 140 can start an instance 250 of a virtual machine. The virtual machine can be selected from amongst multiple options based on the configuration (and, by association, the profile 230). In one example, a new instance is created for the user device 110 even if another instance is already active for another user device 115.

The instance 250 can be one of multiple instances 250 and 260 (of the same or different virtual machines) that are managed by a hypervisor 240 on the thin server 140. Based on the profile-specific configuration, the thin server 140 can cause the instance 250 to execute a guest application 255 that corresponds to the thin client 220. In another example, the instance 250 can execute a guest operating system 252 that allows the user to select from multiple guest applications 255 based on the configuration. The instance 250 can maintain a virtual frame buffer 270 for communicating graphics information to the thin client 220 executing on the user device 110. In one example, the guest operating system 252 or guest application(s) 255 can send graphics information to the frame buffer 270 instead of to a physical frame buffer at the thin server 140.

At stage 360, the instance 250 can send the graphics information from the frame buffer 270 to the thin client 220 at the first user device 110. Sending the graphics information can include sending frames of pixels in one example. The frame buffer 270 can buffer multiple frames of pixels per second in one example. Each frame can be a snapshot of pixels at an instant in time. A higher frequency frame buffer 270 can provide smoother animation when the frames are displayed at the thin client 220, but can require greater network bandwidth. In another example, the graphics information in the frame buffer 270 can include vector information for recreating graphics at the thin client 220.

The frames in the frame buffer 270 can be sized to match a window or screen size of the thin client 220 executing on the first user device 110. In one example, the frame buffer request of stage 330 includes an initial screen size for appropriately sizing frames or other graphics information within the frame buffer 270. In another example, the frame size is a fixed size that is set to fill the screen of the first user device 110 and is maintained at the management server 130 based on the device type of the first user device 110. In still another example, the frame size can be changed based on UI action events generated at the thin client 220 when the user resizes the thin client 220 window.

In one example, the thin client 220 opens a socket for sending graphics information from the instance 250 to the user device 110, and for sending UI events from the thin client 220 to the instance 250. The management server 130 can send a token or key to the first user device 110 and a corresponding token or key to the thin server 140 for use in communicating between the first user device 110 and the instance 250 at the thin server 140. As frames are sent to the thin client 220 and receipt verification is received, the instance 250 can remove those frames from the frame buffer 270 while adding additional frames to the frame buffer 270 in substantially real time.

As the thin server 140 displays the graphics information locally at the first user device 110, the thin client 220 can listen for UI events, also referred to as UI actions. UI events can include mouse movements, typing, clicking, touch screen events, or any user input within the thin client 220. Capturing UI events can include tracking a UI event type. Additionally, in one example the thin client 220 can capture timing information and location information, such as coordinates, related to the UI event. In one example, a current pointer location is tracked at the guest application 255 or guest operating system 252 at the instance 250. In this example, mouse movements can generate UI events that specify a direction and distance to move the pointer. In another example, the pointer is tracked at the thin client 220, and a UI event can specify a new location for the pointer.

At stage 370, the thin client 220 can send the UI events to the instance 250 for performance within the guest application 255. Sending a UI event can include sending an event type, such as a click, and a location.

The instance 250 can perform the UI events within the guest environment in the order in which they are received from the thin client 220 of the first user device 110. A UI administration process 280 can be configured to translate UI events into a format recognized by the guest operating system 252 or guest application 255 of the specific virtual machine instance 250. This can allow the thin client 220 to be agnostic towards the guest operating system 252 of the instance 250 with respect to compatibility and functionality. The UI administration process 280 can then communicate the translated UI event to the operating system 252 or guest application 255 for execution. For example, a click at a particular location within the thin client 220 can be performed at the location within the guest application 255.

When the UI events are applied within the virtual machine instance 250, the graphics can update in response. For example, when a drop-down menu is selected, new menu items are displayed, or when text is typed, the text appears.

During this process, the frame buffer 270 continues to receive new graphics information for transmission to the thin client 220.

At step 380, the new graphics information can be sent from the frame buffer 270 to the thin client 220 of the user device 110. This can allow the user to see the effect of his or her actions. This process can continue indefinitely, allowing the user to effectively use a guest application 255 or guest operating system 252 as configured based on the user's specific profile information. When a user closes the thin client 220, because only graphics information has been sent to the hardware on the user device 110, in one example no enterprise data is stored on the user device. Caching related to graphics processing can also be cleared.

Figure 4:
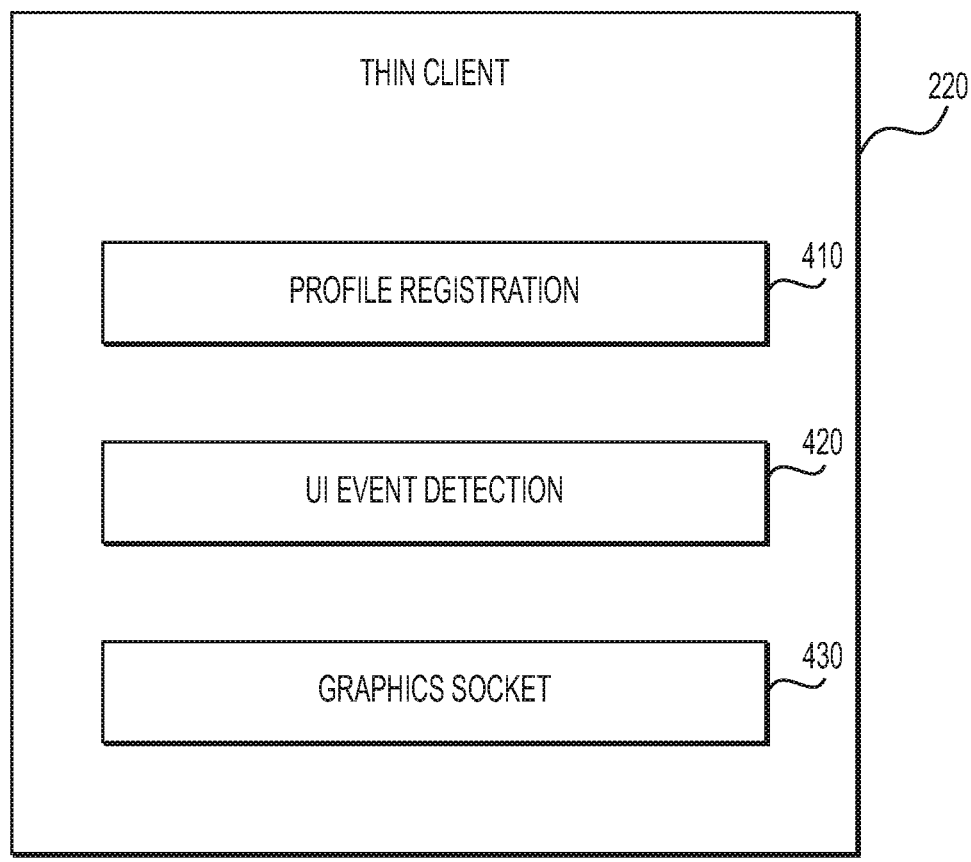
FIG. 4 is an exemplary illustration of thin client components.

FIG. 4 includes example components of a thin client 220. The thin client can be agnostic to functionality of the guest applications 255 and 265 and guest operating systems 252 and 262 in one example. Instead, as has been described, the thin client 220 can receive graphics information and send UI events to the remote guest environment.

The thin client 220 can include a profile registration component 410 in one example. The profile registration component 410 can distinguish the thin client 220 version on a first user device 110 from another thin client 220 installed on a second user device 115. As described with regard to the enrollment stage 310 of FIG. 3, profile registration can take into account user-specific attributes, such as location and user group, and device-specific attributes, such as the operating system and applications available on the user device 110. The thin client 220 sent and installed at the user device 110 can be selected based on the registered profile(s) 230.

The thin client 220 can also include a UI event detection component 420. The UI event detection component 420 can listen for any user inputs or activities that are sent to the thin client 220. This can include user actions such as mouse movement, clicking, touch screen activity, typing, voice input, or any other user action. Specific functions, such as screen resizing, can also be detected as UI events. The UI event detection component 420 can characterize UI events in a format that is understood by the UI administration process 280 at the thin server 140. This can allow the UI event detection component 420 to send UI events without regard to formatting required by a particular guest operating system 252 or guest application 255.

The thin client 220 can also utilize a graphics socket component 430 for connecting to a socket that runs on a specific virtual machine instance 250. The socket can be based on the Internet Protocol or Transmission Control Protocol in one example. However, the graphics socket 430 can include any technology for securely communicating information between a host and a receiver. The graphics socket component 430 can allow for the transmission of UI events from the thin client 220 to the instance 250. The graphics socket component 430 can also allow the thin client 220 to receive graphics information from the instance 250.

Figure 5:
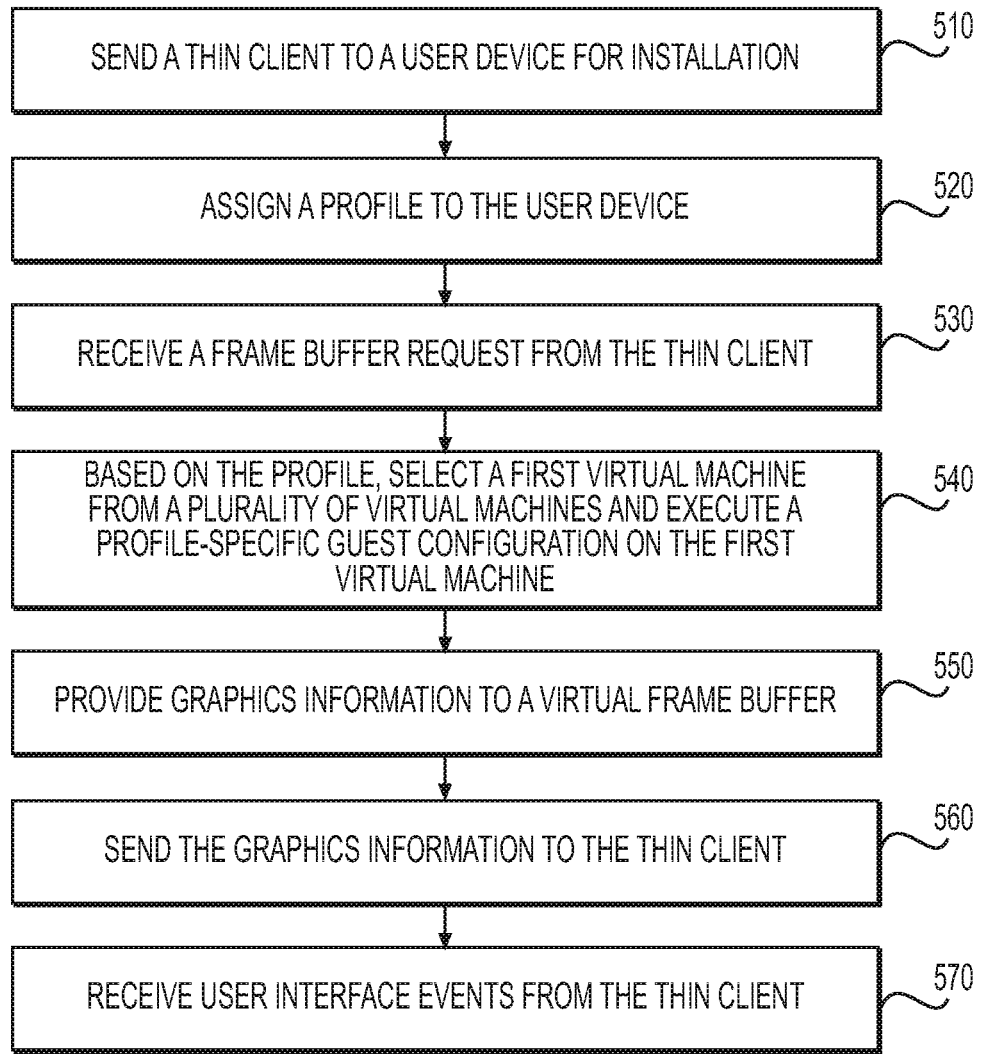
FIG. 5 is an exemplary method executed in a system.

FIG. 5 is an exemplary method performed by a management server 130 and thin server 140 in an example. At stage 510, the system sends a thin client 220 to a user device 110 for installation. The thin client 220 can be selected based on the profile 230 assigned to the user device 110 in stage 520 in one example. The profile 230 can specify a virtual machine configuration 254. The virtual machine configuration 254 can specify or configure attributes of the guest environment, such as the guest operating system 252, guest applications 255, or functionality restraints on either.

At stage 530, the system can receive a frame buffer request from the thin client 220. The system can identify the associated profile 230 from stage 520.

Based on the identified profile 230, at stage 540, the system can select a first virtual machine from a plurality of virtual machines. The virtual machine can be selected and instantiated using the virtual machine configuration 254 associated with the profile 230. The instance 250 can execute at least one guest application 255 based on the virtual machine configuration 254.

At stages 550 and 560, the system can send graphics information from the guest application 255 to the thin client 220. This can include collecting frames of pixels in a frame buffer 270 at stage 550. Then, the frames of pixels can be sent to the thin client 220 at stage 560.

At stage 570, the system can receive user interface events that are detected at the thin client 220. These user interface events can be applied within the guest environment, allowing the user to remotely control the guest environment while only receiving graphics information from the guest environment.

Although an example has been described where the thin client 220 or guest applications 255 and 265 are managed applications, these applications can also be unmanaged applications. In addition, the management server 130 and thin server 140 can be part of the same server in an example.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for managing profile-based virtual machines, the system comprising:

a management server having a non-transitory, computer-readable medium and a processor, management server assigning a profile to a user device, the profile being associated with a virtual machine configuration and a set of file access permissions based at least in part on a user's role within an enterprise, wherein the profile is stored remotely from the user device and is one of multiple profiles assigned to different users in an enterprise; and a thin server that is remote from the user device, the thin server having at least one processor that performs stages including:

sending a thin client to the user device for installation;

receiving a request from the thin client installed on the user device;

executing a hypervisor that includes a talkback process;

instantiating, by the hypervisor, based on the profile assigned to the user device and the request, an instance of a first virtual machine, the instance executing at least one guest application and a management component as specified by the virtual machine configuration, wherein the virtual machine configuration prevents access by the guest application to a first file and grants access to a second file in accordance with the set of file access permissions, the first and second files being remote from the user device;
    sending graphics information from the executing guest application to the thin client in response to the request;
    receiving, from the thin client, user interface events that are executed by the guest application, the events being part of an attempt to access the first file;
    retrieving, by the talkback process in response to the attempt, a credential from the thin server and causing a management interface to supply the credential to a management server; and
    receiving, from the management server, subsequent to supplying the credential, a call to the management component modifying the configuration of the instance of the first virtual machine to grant the guest application access to the first file.

2. The system of claim 1, wherein the first virtual machine is selected from a plurality of virtual machines based on the profile, the first virtual machine having a first guest operating system that is different from a second guest operating system of a second virtual machine.

3. The system of claim 1, the stages further comprising:
    receiving a second request from a second user device that is assigned to a different profile than the first user device;
    based on the different profile assigned to the second user device, selecting a second virtual machine from a plurality of virtual machines, wherein an instance of the second virtual machine includes a different virtual machine configuration than the instance of the first virtual machine.

4. The system of claim 1, the stages further comprising executing a hypervisor that manages a plurality of instances of virtual machines, each instance being assigned to a different user device based on profiles associated with those user devices.

5. The system of claim 1, wherein the thin client causes the user device to listen for the user interface events, wherein a first user interface event includes an input relative to a display area of the thin client, and wherein the thin client reports the input and the relative location to the instance.

6. The system of claim 1, wherein the profile specifies a subset of guest applications to make available from a plurality of guest applications, wherein the guest application is within the subset of guest applications.

7. A non-transitory, computer-readable medium containing instructions executed by at least one processor to perform stages for managing profile-based virtual machines, the stages comprising:
    sending a thin client to a user device for installation;
    assigning a profile to the user device, the profile being associated with a virtual machine configuration and a set of access permissions based at least in part on a user's role within an enterprise, wherein the profile is stored remotely from the user device and is one of multiple profiles assigned to different users in an enterprise;
    receiving a request from the thin client installed on the user device;
    executing, at a thin server that is remote from the user device, a hypervisor that includes a talkback process;
    instantiating, by the hypervisor, based on the profile assigned to the user device and the request, an instance of a first virtual machine, the instance executing at least one guest application and a management component as specified by the virtual machine configuration, wherein the virtual machine configuration prevents access by the guest application to a first file and grants access to a second file in accordance with the set of file access permissions, the first and second files being remote from the user device;
    sending graphics information from the executing guest application to the thin client in response to the request;
    receiving, from the thin client, user interface events that are executed by the guest application, the events being part of an attempt to access the first file;
    retrieving, by the talkback process in response to the attempt, a credential from the thin server and causing a management interface to supply the credential to a management server; and
    receiving, from the management server, subsequent to supplying the credential, a call to the management component modifying the configuration of the instance of the first virtual machine to grant the guest application access to the first file.

8. The non-transitory, computer-readable medium of claim 7, wherein the first virtual machine is selected from a plurality of virtual machines based on the profile, the first virtual machine having a first guest operating system that is different from a second guest operating system of a second virtual machine.

9. The non-transitory, computer-readable medium of claim 7, the stages further comprising:
    receiving a second request from a second user device that is assigned to a different profile than the first user device;
    based on the different profile assigned to the second user device, selecting a second virtual machine from a plurality of virtual machines, wherein an instance of the second virtual machine includes a different virtual machine configuration than the instance of the first virtual machine.

10. The non-transitory, computer-readable medium of claim 7, the stages further comprising executing a hypervisor that manages a plurality of instances of virtual machines, each instance being assigned to different user devices based on profiles associated with those user devices.

11. The non-transitory, computer-readable medium of claim 7, wherein the thin client causes the user device to listen for the user interface events, wherein a first user interface event includes an input relative to a display area of the thin client, and wherein the thin client reports the input and the relative location to the instance.

12. The non-transitory, computer-readable medium of claim 7, wherein the profile specifies a subset of guest applications to make available from a plurality of guest applications, wherein the guest application is within the subset of guest applications.

13. A method for managing profile-based virtual machines, comprising:
    sending a thin client to a user device for installation;
    assigning a profile to the user device, the profile being associated with a virtual machine configuration and a set of access permissions based at least in part on a user's role within an enterprise, wherein the profile is stored remotely from the user device and is one of multiple profiles assigned to different users in an enterprise;
    receiving a request from the thin client installed on the user device;

executing, at a thin server that is remote from the user device, a hypervisor that includes a talkback process;

instantiating, by the hypervisor, based on the profile assigned to the user device and the request, an instance of a first virtual machine, the instance executing at least one guest application and a management component as specified by the virtual machine configuration, wherein the virtual machine configuration prevents access by the guest application to a first file and grants access to a second file in accordance with the set of file access permissions, the first and second files being remote from the user device;

sending graphics information from the executing guest application to the thin client in response to the request;

receiving, from the thin client, user interface events that are executed by the guest application, the events being part of an attempt to access the first file;

retrieving, by the talkback process in response to the attempt, a credential from the thin server and causing a management interface to supply the credential to a management server; and receiving, from the management server, subsequent to supplying the credential, a call to the management component modifying the configuration of the instance of the first virtual machine to grant the guest application access to the first file.

14. The method of claim 13, wherein the first virtual machine is selected from a plurality of virtual machines based on the profile, the first virtual machine having a first guest operating system that is different from a second guest operating system of a second virtual machine.

15. The method of claim 13, the stages further comprising:

receiving a second request from a second user device that is assigned to a different profile than the first user device;

based on the different profile assigned to the second user device, selecting a second virtual machine from a plurality of virtual machines, wherein an instance of the second virtual machine includes a different virtual machine configuration than the instance of the first virtual machine.

16. The method of claim 13, wherein the thin client causes the user device to listen for the user interface events, wherein a first user interface event includes an input relative to a display area of the thin client, and wherein the thin client reports the input and the relative location to the instance.

17. The method of claim 13, wherein the profile specifies a subset of guest applications to make available from a plurality of guest applications, wherein the guest application is within the subset of guest applications.

* * * * *